Patented Dec. 12, 1922.

1,438,643

UNITED STATES PATENT OFFICE.

KENNETH S. GUITERMAN, OF LAWRENCE, NEW YORK.

RECOVERY OF ZINC.

No Drawing.  Application filed January 14, 1920.  Serial No. 351,439.

*To all whom it may concern:*

Be it known that I, KENNETH S. GUITERMAN, a citizen of the United States, and resident of Lawrence, in the county of Nassau and State of New York, have invented certain new and useful Improvements in the Recovery of Zinc, of which the following is a specification.

The invention relates in general to a refinement in metallurgical processes for recovering zinc and other similar non-ferrous metals from slags, scoria and the like, and for recovering the desired non-ferrous metals from such slags in a substantially refined condition, and the invention particularly relates to the treatment of those ores and metallurgical products in which the non-ferrous metal desired is present in a relatively small percentage.

In order to identify the position of the invention in the art attention is called to the known process where ores smelted for the recovery of their non-ferrous metal content (Pb, Zn, Cu, Ag, Au, etc.) are as a rule subjected to a primary concentration in a blast furnace. In the following description of the known art, the several steps will be recited briefly for clearness of disclosure rather than from a strictly technically exact recitation of any sequence of operations. The original ore is mixed with limestone and a certain amount of coke is added in order to cause a reduction of the oxidized metals to the metallic state. As soon as the blast furnace smelting operation is complete, the whole contents of the furnace is tapped off into a settling chamber. Here the hot molten mass is allowed to remain for a short period of time during which definite and easily separated strata are formed. However, it is to be understood that here and in some of the following operations the settling out of the different strata is effected within the furnace and the different substances removed continually from suitably placed tap-holes. On the bottom of the settler rests the base bullion which consists of the major portion of the non-ferrous metals originally present in the ore. On top of this rests a stratum of "speiss" which consists roughly of a compound arsenide should any arsenic happen to have been present. Next above the speiss will be found the matte which consists of a complex sulphide carrying relatively large percentages of both ferrous and non-ferrous metals. On the very top rests the slag which is properly the only waste product and will be identified hereinafter as the primary slag. This slag will retain relatively small amounts of the non-ferrous metals with the exception of zinc. It will, however, carry all of the acid constituents of the ore (silica, etc.) together with all of the lime, alumina, etc. Also it will contain all of the iron which is not present in the speiss or matte.

From this brief description of the known art it will be appreciated that in such pyro-metallurgical operations there are usually formed two principal products, one a main product carrying substantially all of the valuable metals sought to be recovered and present in relatively large percentages, and the other a waste product, slag or scoria, identified as primary slag and which carries practically all of the impurities or gangue elements together with small percentages of the more valuable metals present in the original ore. This primary slag consists of practically all of the iron in the original charge, except that remaining with the matte or speiss as above mentioned, all of the alumina ($Al_2O_3$), all of the lime, (CaO), all of the silica ($SiO_2$), as well as relatively small amounts of the easily oxidized elements such as zinc (probably as oxide or silicate), lead, copper and certain non-ferrous metals. The present invention relates in general to a process of treating this primary slag to recover its non-ferrous metal contents.

Under present practices it is too expensive to recover the small percentages of non-ferrous metals present in this slag. Various attempts, however, have been made to recover them but without success from a commercial standpoint. Most of these processes, as for instance, those utilized to recover the zinc, have involved a re-smelting of the slag under reducing conditions, such as through the admixture of coke. By such means it was hoped to reduce the oxidized zinc in the slag and then volatilize it as a result of the high temperatures attained. This was in accordance with the theory that the reducing agent would exert a selective action on the non-ferrous oxides causing a reduction thereof and permit either a recovery in the metallic state or else permit a distillation of the metal with subsequent condensation. This method was unsuccessful, among other reasons, due to the fact that any slag high in iron content will exert a solvent action on zinc as well as on certain other non-ferrous metals. It is practically impossible to reduce and recover zinc from such ferrous slags and the same comment applies to a greater or less extent to other non-ferrous metals usually found in such primary slags.

Rather than attempt to effect a direct selective action of the reducing agent on these metals and then separate them directly from the slag, as has been tried heretofore, I propose first to counteract the solvent action of the slag upon the small amounts of non-ferrous metals present and at the same time overcome the effect of the mass action of the preponderating amount of iron in the slag, thereby promoting a secondary selective action of the reducing agent upon the non-ferrous metals present and permitting of their recovery from the slag. In carrying out such a process, there is formed a secondary slag containing little, if any, iron and having but a small solvent action upon non-ferrous metals. Furthermore as a consequence it becomes a simple matter to effect a reduction of the non-ferrous metals and, as they are relatively insoluble in slags free from iron, they can either be recovered as molten metals or condensed from the fumes depending upon the individual boiling points. At the same time the iron contents of the primary slag may be recovered in a form permitting of its subsequent utilization.

One means for removing the non-ferrous metals in the primary slag is to subject this primary slag to a resmelting operation in the presence of a reagent capable of substitution for the iron in the slag and hence its elimination therefrom. This can be effected economically by a reducing operation in which the slag is mixed with a basic reagent such as limestone and a reducing reagent such as coke in sufficient quantities to reduce the oxide of iron in the slag and to replace it with lime.

As suggested the iron can be readily separated. The secondary slag produced which consists substantially of a silicate of lime and alumina and can readily be separated by the usual methods. The zinc and other non-ferrous metals desired can be recovered either in a liquid form or can be condensed from the furnace gases or fumes, by well known methods.

By this process it is possible to recover the heretofore lost metals from the primary slags and thus utilize a waste product with resulting economy in pyro-metallurgical operations of the class discussed.

Having thus described my invention, I claim:

1. In the art of recovering non-ferrous metals, such as zinc from primary slags or scoria in which the presence of large amounts of iron exert a solvent action on the non-ferrous metal, the process which consists in smelting the slag in the presence of a reducing agent and an iron replacing reagent which will minimize the solvent action of the iron present and which will permit the formation of a secondary slag substantially free from iron and separating the resulting non-ferrous metals from the secondary slag.

2. In the art of recovering non-ferrous metals, such as zinc from primary slags or scoria in which the presence of large amounts of iron exert a solvent action on the non-ferrous metal, the process which consists in smelting the slag in the presence of an iron replacing reagent which will minimize the solvent action of the iron present and which will permit the formation of a secondary slag substantially free from iron and separating the resulting non-ferrous metals from the secondary slag.

3. In the art of recovering non-ferrous metals, such as zinc from slags or scoria in which the presence of large amounts of iron exert a solvent action on the non-ferrous metal, the process which includes the steps of smelting the slag with a reducing agent and a basic reagent in sufficient amount to replace the iron in the slag and separating the iron and non-ferrous metals.

4. In the art of recovering a non-ferrous metal, such as zinc from the slag or scoria resulting from a non-ferrous pyro-metallurgical operation and which contains a relatively high percentage of iron, the process which consists in removing the non-ferrous metal from the solvent influence of the iron present by a smelting operation in the presence of a reagent capable of neutralizing the solvent action of the iron.

5. In the art of recovering a non-ferrous metal, such as zinc from slags or scoria resulting from non-ferrous pyro-metallurgical operations, the process which involves a resmelting of such slags or scoria in the presence of a basic iron-replacing reagent and a reducing agent whereby the solvent action of the ferrous slag for non-ferrous metals is eliminated and whereby the mass action of the preponderating amount of iron upon the reducing agent is removed.

6. In the art of recovering a non-ferrous metal, such as zinc, from slags or scoria obtained from non-ferrous pyrometallurgical operations, the process which consists in reducing the iron in the slag, replacing it with another basic radical and recovering the non-ferrous metals from this secondary slag by reduction.

7. In the art of recovering a non-ferrous metal, such as zinc, from slags or scoria obtained from non-ferrous pyrometallurgical operations, the process which consists in replacing the iron in the slag with another radical and recovering the non-ferrous metals from this secondary slag.

Signed at Lawrence, in the county of Nassau and State of New York, this 8th day of January A. D. 1920.

KENNETH S. GUITERMAN.